United States Patent [19]

Aubert et al.

[11] 4,440,834

[45] Apr. 3, 1984

[54] PROCESS FOR THE MANUFACTURE OF TURBINE BLADES COOLED BY MEANS OF A POROUS BODY AND PRODUCT OBTAINED BY THE PROCESS

[75] Inventors: Jean-Pierre P. A. Aubert, Charenton; Jacques P. H. Tirole, Sevres, both of France

[73] Assignee: Societe Nationale d'Etude et de Construction de Moteurs d'Aviation, S.N.E.C.M.A., France

[21] Appl. No.: 267,540

[22] Filed: May 27, 1981

[30] Foreign Application Priority Data

May 28, 1980 [FR] France .................................. 80 11769

[51] Int. Cl.³ .............................................. B22F 5/00
[52] U.S. Cl. ..................................... 428/554; 428/553; 419/2; 419/23; 416/96 R; 29/156.8 H
[58] Field of Search .......................... 29/156 B, 156 H; 416/96 R, 96 A, 231 R, 241 R; 419/2, 11, 23; 428/553, 554

[56] References Cited

U.S. PATENT DOCUMENTS

| | | | |
|---|---|---|---|
| 2,648,520 | 8/1953 | Schmitt | 29/156.8 H |
| 2,665,881 | 1/1954 | Smith et al. | 29/156.8 H |
| 2,679,669 | 6/1954 | Kempe | 29/156.8 H |
| 2,687,278 | 8/1954 | Smith et al. | 29/156.8 H |
| 2,921,769 | 1/1960 | Flader | 253/39 |
| 3,402,914 | 9/1968 | Kump et al. | 416/231 R |
| 4,137,619 | 2/1979 | Beltran et al. | 416/241 R |
| 4,272,290 | 6/1981 | Lesgourgues | 75/212 |

FOREIGN PATENT DOCUMENTS

| | | | |
|---|---|---|---|
| 879485 | 6/1953 | Fed. Rep. of Germany | 416/96 R |
| 619634 | 12/1949 | United Kingdom | 416/231 R |

*Primary Examiner*—Brooks H. Hunt
*Attorney, Agent, or Firm*—Bacon & Thomas

[57] ABSTRACT

The cavity of a hollow turbine has its bottom equipped with a temporary means of obturation and is filled with a mixture of metal chips and a powder consisting of low melting metals, said mixture being subjected to a heating operation in order to join the chips with each other and with the walls of the blade by means of diffusion brazing of said fusible metal.

11 Claims, 6 Drawing Figures

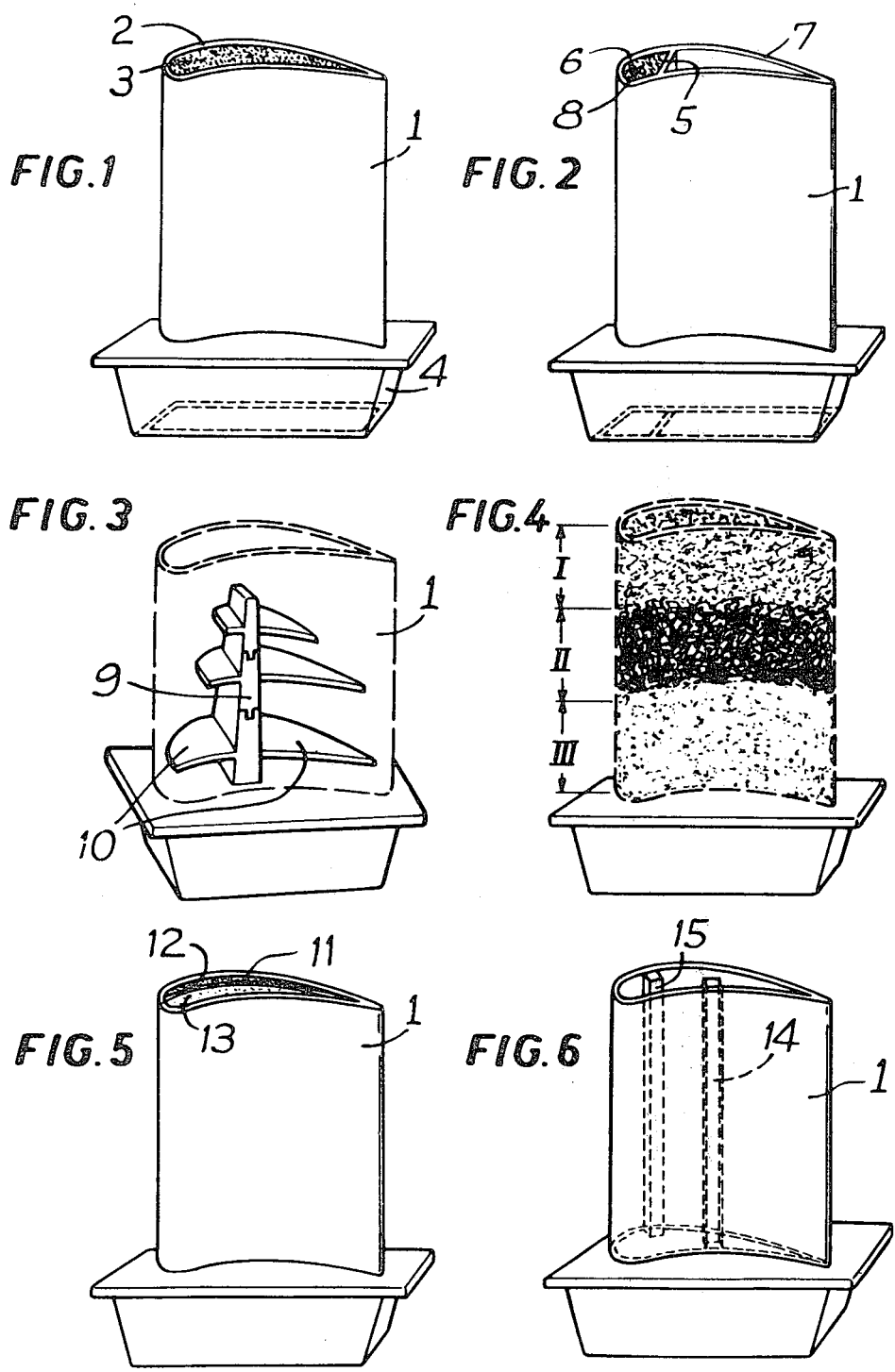

PROCESS FOR THE MANUFACTURE OF TURBINE BLADES COOLED BY MEANS OF A POROUS BODY AND PRODUCT OBTAINED BY THE PROCESS

BACKGROUND OF THE INVENTION

The present invention is a process for the manufacture of turbine blades cooled by means of a porous body and product obtained by this process.

Cooled turbine blades presently in use employ sophisticated cast devices, such as the presence inside the hollow blades of picots, loops, fins, disturbers, etc. These internal organs of blades are produced by means of complicated and expensive ceramic cores, which must be dissolved after casting and which render the task of the founders delicate.

It is further possible to obtain satisfactory cooling of the blades by filling the cavity of hollow blades with a porous material which has the additional advantage of contributing to their mechanical strength by attenuating vibrations.

Experiments were effected with a material consisting of microspheres brazed by diffusion, but in such a material pressure losses are large and the circulation of the air requires very high pressures.

A porous material is known further, consisting of metal chips and being the object of U.S. application Ser. No. 58,487, filed July 18, 1979, said material having a porosity five to six times greater than that of the material made of spheres.

SUMMARY OF THE INVENTION

According to the present invention, a process is used for the manufacture of turbine blades cooled by means of a porous body, wherein the cavity of the blade, the bottom whereof is equipped with a provisional means of obturation, is filled either with a mixture of metal chips and a powder prepared from metals with a low melting point, or metal chips coated with low melting point metals, the assembly being subjected to a heating operation in order to join the chips among themselves and the walls of the blade by means of diffusion brazing with the low melting metal.

The shape of strips and of commas, wherein metal chips generally appear, result in several favorable consequences both in regard to the mechanical strength of the blade and the heat transfer coefficient.

In addition to mechanical strength, it has been found that the filling changes the frequency of resonance of the vibrating mass. The joining of the two walls by means of a filling of chips provides an effect intermediate between that obtained with rigid bridging and with hollow blades. The mass of the filling thus absorbs a certain amount of work and plays the role of a damping device, contributing to the elimination of the effects of relative vibration between the two walls.

It should be noted that during the course of the operation of filling, the chips have a tendency, in the vicinity of the walls, to arrange themselves in a manner so that their flat side is in part in contact with the wall, thus offering a contact surface sufficient for joining by means of diffusion brazing.

With respect to the use of microspheres as the filler material, a disadvantage is hereby eliminated, which has been observed at the instant of the operation of joining by means of a powder of low melting metals. The latter results in effect in the formation of small meniscuses between the spheres, thereby considerably reducing the porosity.

Concerning the advantages in relation to the transfer of heat, it is found that the effect of the metallic conduction provided by the chips may be superposed on the convection effect provided by the large heat transfer surface offered, thereby establishing a lengthened heat transfer path for the cooling air circulating in the central part of the blade.

It is found finally that because of their machining, the chips always have a rough surface, with the asperities thereof forming perturbators which act to break up the laminar boundary layer that could reduce the heat transfer coefficient.

The process according to the invention makes it possible to obtain blades with a cooling system as efficient as those in use at the present time, without having to employ complicated devices and expensive manufacturing processes. The increase in the heat transfer coefficient afforded by the use of metal chips results in a decrease of the flow rate necessary to obtain a given $\Delta t$ for the blades.

Finally, the process leads to an improvement of the mechanical strength of the blades.

BRIEF DESCRIPTION OF THE DRAWINGS

Other characteristics and advantages of the invention will become more apparent from the description hereinafter of several embodiments of the invention and by referring to the drawings attached hereto, wherein:

FIG. 1 is a perspective view of a turbine blade made by the process of the present invention;

FIG. 2 is a perspective view of a blade having a vertical internal partition;

FIG. 3 is a perspective view of a blade having vertical and transverse partitions;

FIG. 4 is a perspective view of a blade wherein the packing of the chips varies in the radial direction;

FIG. 5 is a perspective view of a blade having a transverse partition;

FIG. 6 is a perspective view of a blade having radial passages along the walls.

DESCRIPTION OF THE PREFERRED EMBODIMENTS

FIG. 1 shows a turbine blade 1 having a cavity 2, filled with a porous body 3 prepared according to the invention.

The porous body consists of chips obtained by the milling or turning or the machining by any other means of a highly heat conductive metallic material. By controlling the cutting velocity and the depth of the pass, chips which break into practically uniform lengths, are obtained.

According to the process that is the object of U.S. Ser. No. 58,487, (now U.S. Pat. No. 4,272,290) the chips are mixed with a powder consisting of low melting point metals.

The mixture comprises approximately 85 to approximately 99.5% by weight of chips of a base metal chosen from among nickel, chromium, tungsten, molybdenum, iron and cobalt and different alloys of these metals, and approximately 15 to 0.5% by weight of a fusible auxiliary metal chosen from among tin, indium, gallium, germanium, antimony and the mixtures and alloys of said metals.

The cavity 2 of the blade is filled with the mixture 3 defined hereinabove, after having temporarily closed off the bottom of the blade with the aid of a soluble plate or a special assembly introduced through the root 4 of the blade.

The blade 1 filled in this manner by the mixture, is placed in a furnace to obtain the diffusion brazing of the chips to each other and to the walls of the blades. The assembly is heated under a controlled atmosphere and in the absence of pressure, at a temperature and for a duration sufficient to induce the melting and the diffusion of the fusible metal in the chips and in the wall of the blade.

A porous material according to the invention, but distributed in a uniform fashion throughout the inside of the blade, may, in certain applications, prevent the blade from becoming isothermal.

To account for this necessity, the porosity of the material 3 and its heat transfer coefficient may be varied both axially and radially, or transversely.

In FIG. 2, a blade is shown having an axially placed partition 5, which divides the principal cavity of the blade in two cavities 6 and 7, one of which, 6, receives a certain quantity of chips 8, which may be further compressed prior to their passage to the furnace.

In the different cavities defined by one or a plurality of axial partitions, such as 5, chips of different moduli may be used, or it is possible to fill only a single cavity as shown in FIG. 2 and leave the cavity 7 empty.

The partition 5 separating the cavities 6 and 7 may be temporary, for example, of silica, which dissolves after casting. This partition, after having been dissolved, leaves an empty column which may be used to supply cooling air to the porous columns.

As shown in FIG. 3, a temporary axial partition 9, branching into temporary transverse partitions 10, is placed in the cavity of the blade 1, as shown in FIG. 3, with said partitions leaving, after their dissolution, a plurality of empty spaces to modulate the air supply according to the radial level of the blade.

It should be noted that with the present casting methods it is difficult to effect the cavity of the leading edge, because of its small radius, while this represents the hottest zone of the blade. This is the location of the neutral point and the presence of two acceleration zones may be noted on either side of the neutral line; this acceleration leading to an unfavorable heat transfer coefficient (more heat being released at the wall of the leading edge).

For a fixed blade, two feeds may be used, one on the bottom and the other on top.

Furthermore, the leading edge may be perforated by an electrolytic process and this permits the combination of the effect of sudation with the effects of conduction and forced convection in the material.

According to another embodiment shown in FIG. 4, the packing of the chips may vary in the radial direction in order to create the zones I, II and III wherein the heat transfer coefficient of the material varies from the root to the tip of the blade (Zone I). This variation of the heat transfer coefficient may also be obtained by varying the modulus of the chips.

A slight porosity in the intermediate zone II, as shown in the example of FIG. 4, corresponds advantageously with the distribution profile of temperature of the blade and favors both cooling by conduction and cooling by convection, due to the acceleration of the heat carrying fluid in the multiple channels of the zone.

Similarly, for a blade displaying temperature heterogeneities between the intrados and the extrados of its arc, a partition 11, which may be soluble or not, is provided, said partition extending between the leading edge and the trailing edge, so as to create two cavities 12 and 13, involving respectively the extrados and the intrados of the blade. This arrangement makes it possible to use in the cavities 12 and 13 a chip packing or modulus different from one face to the other, and to vary radially the packing or the modulus on one face or on both.

In FIG. 6, a blade is shown, in the cavity whereof small temporary straight or branched columns 14 and 15 are provided; they are disposed along the walls. Following the dissolution of the columns 14 and 15, a plurality of radial passages is obtained, in order to circulate air in the different layers of the porous material.

We claim:

1. A process for making turbine blades comprising the steps of:
    (a) forming a hollow turbine blade such that the ends of the blade are open;
    (b) temporarily closing one end of the hollow turbine blade;
    (c) placing at least one partition in the hollow blade extending from one end of the blade to the other so as to define separate cavities therein;
    (d) filling at least one of the separate cavities with a mixture comprising approximately 85% to 99.5% by weight of chips formed of a base metal chosen from the group consisting of nickel, chromium, tungsten, molybdenum, iron, cobalt, and different alloys of these metals, and approximately 15% to 0.5% by weight of a secondary metal selected from the group consisting of tin, indium, gallium, germanium, antimony, and mixtures and alloys of these metals; and,
    (e) heating the assembly sufficiently to fuse the secondary metal to thereby join the metal chips to each other and to the walls of the blade.

2. The process according to claim 1 including the step of placing the partition so that it extends laterally across the blade section and divides the interior of the blade into two cavities.

3. The process according to claim 1 including the step of placing the partition so that it extends between a leading edge and a trailing edge of the blade to divide the interior of the blade into two cavities involving the extrados and intrados of the blade.

4. The process according to claim 3 including the additional step of filling the second cavity with a mixture comprising approximately 85% to 99.5% by weight of chips formed of a base metal selected from the group consisting of nickel, chromium, tungsten, molybdenum, iron, cobalt, and alloys of these metals, and approximately 15% to 0.5% by weight of a secondary metal selected from the group consisting of tin, indium, gallium, germanium, antimony, and mixtures and alloys of these metals, wherein the packing density of the chips in the second cavity is different from the packing density of the chips in the first cavity.

5. The process according to any one of claims 1, 2, 3, or 4 comprising the additional step of forming the secondary metal in the form of a powder.

6. The process according to any one of claims 1, 2, 3, or 4 comprising the additional step of coating the chips of base metal with the secondary metal.

7. The process according to any one of claims 1, 2, 3 or 4 comprising the additional step of dissolving the partition after the secondary metal has been fused.

8. An air-cooled turbine blade comprising:
   (a) a hollow turbine blade formed such that the ends of the blade are open;
   (b) means to at least temporarily close one end of the blade;
   (c) a partition located within the hollow blade and extending from one end of the blade to the other to divide the blade interior into separate cavities; and
   (d) a porous filling located in at least one of the cavities, the filling comprising approximately 85% to 99.5% by weight of chips formed of a base metal selected from the group consisting nickel, chromium, tungsten, molybdenum, iron, cobalt and alloys of these metals, and approximately 15% to 0.5% by weight of a secondary metal selected from the group consisting of tin, indium, gallium, germanium, antimony, and mixtures and alloys of these metals, wherein the secondary metal fuses the chips to each other and to the interior walls of the blade such that the chips define a multiplicity of air channels therebetween.

9. The air-cooled turbine blade of claim 8 wherein the partition extends laterally across the interior of the blade.

10. The air-cooled turbine blade of claim 8 wherein the partition extends between a leading edge and a trailing edge of the blade to divide it into first and second cavities.

11. The air-cooled turbine blade of claim 10 wherein both cavities contain the porous filling and wherein the second cavity contains a porous filling having a chip packing density different from the at least one cavity.

* * * * *